United States Patent [19]

Fukasawa

[11] Patent Number: 4,761,816
[45] Date of Patent: Aug. 2, 1988

[54] DIGITAL LEVEL DETECTING CIRCUIT

[75] Inventor: Hideki Fukasawa, Kanagawa, Japan

[73] Assignee: Sony Corporation, Tokyo, Japan

[21] Appl. No.: 940,943

[22] Filed: Dec. 12, 1986

[30] Foreign Application Priority Data

Dec. 17, 1985 [JP] Japan ............................ 60-283263
Dec. 23, 1985 [JP] Japan ............................ 60-289865

[51] Int. Cl.$^4$ ............................................. H03G 7/00
[52] U.S. Cl. ................................... 381/106; 333/14
[58] Field of Search ................ 381/106, 108; 333/14; 84/1.26

[56] References Cited

U.S. PATENT DOCUMENTS

4,520,708  6/1985  Wachi ..................... 84/1.26
4,611,344  9/1986  Hayama et al. ........... 381/108

Primary Examiner—Forester W. Isen
Attorney, Agent, or Firm—Hill, Van Santen, Steadman & Simpson

[57] ABSTRACT

A digital level detecting circuit for controlling amplitudes of digital audio signals is disclosed, which includes a circuit for generating an attack response of output control signals based on positive going waveforms of an incoming signal and attack response coefficients stored in a memory, and wherein the attack response coefficients stored in the memory are limited to a lower value than the theoretical value at the beginning of the attack response.

8 Claims, 9 Drawing Sheets

DIGITAL LEVEL DETECTING CIRCUIT

BACKGROUND OF THE INVENTION

1. Field of the Invention

This invention relates generally to digital level detecting circuits and particularly to a digital level detecting circuit for use in controlling the amplitude of a digitized audio signal.

2. Description of the Prior Art

In the audio signal system of an 8-mm VTR (video tape recorder), an electronic still camera and so on, in order to obtain a sufficient dynamic range during recording, the level of the audio signal is compressed according to a predetermined characteristic and is then recorded. During reproduction, the level of the reproduced audio signal is expanded according to a characteristic which is complementary to that used during the recording mode so as to reproduce the original audio signal.

Further, in an 8-mm VTR, the audio signal is converted to a PCM (pulse-code-modulated) audio signal before being recorded. In an electronic still camera, during recording, the audio signal is converted from an analog signal to a digital signal and is then timebase-compressed.

Figure 1:
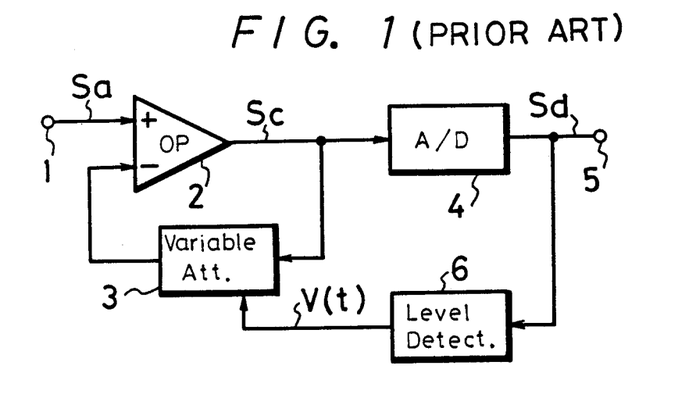
FIG. 1 is a schematic block diagram showing an example of a prior art level compressing circuit.

There has been proposed in the prior art a level compressing circuit for compressing the level of an audio signal such as shown in FIG. 1.

FIG. 1 shows an analog audio signal Sa which is supplied through an input terminal 1 to an operational amplifier 2. A variable attenuator (multiplier circuit) 3 is inserted into the negative feedback path of operational amplifier 2. The amount of attenuation of the attenuator 3 is controlled so that an audio signal Sc which has a level which is compressed will be derived from the operational amplifier 2.

Then, the audio signal Sc is supplied to an A/D (analog-to-digital) converter 4 in which it is converted to a digital signal Sd which has a predetermined number of bits (for example, 10 bits). The digital signal Sd is supplied to an output terminal 5. The digital signal Sd is also supplied to a digital level detecting circuit 6 which produces a detected signal V(t) having a level determined by the digital signal Sd (the level of the analog signal after the digital signal Sd has been converted to an analog signal) and which is in the form of a digital signal. The signal V(t) is supplied as the control signal for the attenuator 3.

The signal Sd developed at the output terminal 5 is the digital signal which results from level-compressing and A/D-converting the audio signal Sa.

Figure 2A:
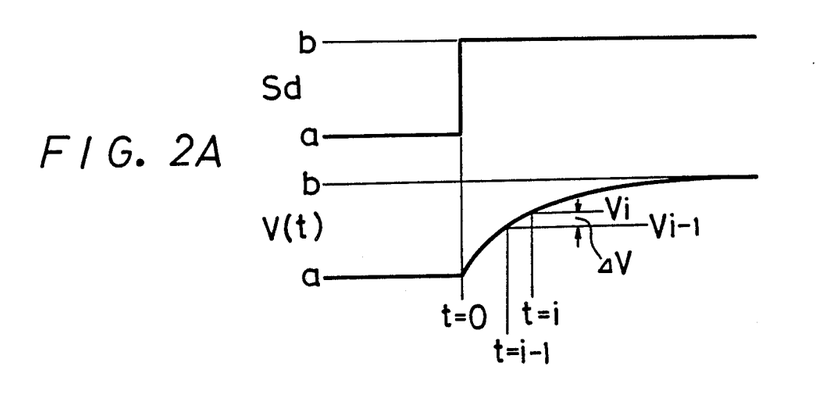
FIGS. 2A and 2B are diagrams respectively showing an attack response characteristic, a hold response characteristic and a recovery response characteristic of an output signal from the circuit shown in FIG. 1.
Figure 2B:
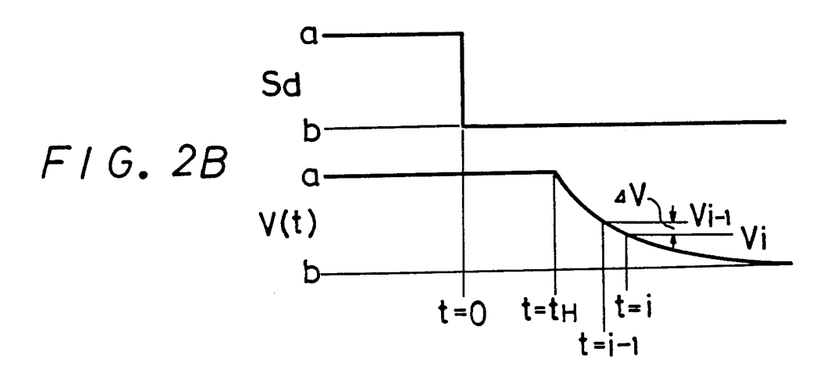

FIGS. 2A and 2B illustrate examples of an attack response characteristic, a hold response characteristic and a recovery response characteristic for the signal Sd, respectively. In FIGS. 2A and 2B, these response characteristics are illustrated in the form of analog signals.

FIG. 2A illustrates the attack response characteristic. When the level of the signal Sd increases stepwise from a value a to a value b at a time, t=0, the attack response characteristic of the signal (voltage) V(t) is expressed by:

$$V(t) = \{[b^N - a^N][1 - \exp(-t/T)] + a^N\}^{1/N} \quad (1)$$

where N and T are constants, respectively.

FIG. 2B illustrates the hold response characteristic and the recovery response characteristic for the signal Sd. When the level of the signal Sd is lowered stepwise from a value a to a value b at a time t=0, during the period of $t \leq t_H$, the hold response characteristic of the signal V(t) is expressed by:

$$V(t) = a \quad (2)$$

and, the recovery response characteristic for the period $t \geq t_H$ is expressed by:

$$V(t) = (b-a)\exp[-(t-t_H)/T_R] + a \quad (3)$$

where $t_H$ and $T_R$ are constants, respectively.

The reason that the signal V(t) has the hold response characteristic and the recovery response characteristic described above is so as to avoid a problem which occurs when the frequency of the signal Sa is low such that the ripple component of the signal V(t) is increased and the signal Sd is modulated with the results that distortion of the low frequency band is increased.

As will be clear from FIG. 2A, in the attack response characteristic, a voltage Vi (=V(i)) at a desired time t=i is provided by adding a voltage $V_{i-1}$ (=V(i-1)) at a sampling time t=i-1 which is the time just before the time t=i with a difference of $\Delta V$ as shown. The difference $\Delta V$ is obtained using an attack response coefficient that is determined by the ratio between the voltage $V_{i-1}$ and the absolute value |Sd| of the signal Sd. Thus, if the initial value is taken as the value a and this value a is sequentially added to the difference of every sampling period, it is possible to obtain the voltage V(t) at time t. Further, the hold response characteristic is flat as indicated by Eq. (2) and the recovery response characteristic results from adding the value a to the discharge curve (exponential function characteristic) of a capacitor. Thus, if the time base is expressed by a recurrence formula in a discrete manner, Eq. (3) can be rewritten as:

$$V(t) = [|Sd| - V(t-1)]k + a \quad (4)$$

In other words, the voltage V(t) can be obtained such that the value a is taken as the initial value and the value which results from multiplying a constant value k by the difference between the voltage |Sd| of the present time t=i and the voltage $V_{i-1}$ at the immediately preceding sampling time t=i-1, is repeatedly added to the value a.

Thus the digital level detecting circuit 6 having the desired response characteristics described above can be constructed as shown in FIG. 3.

Figure 3:
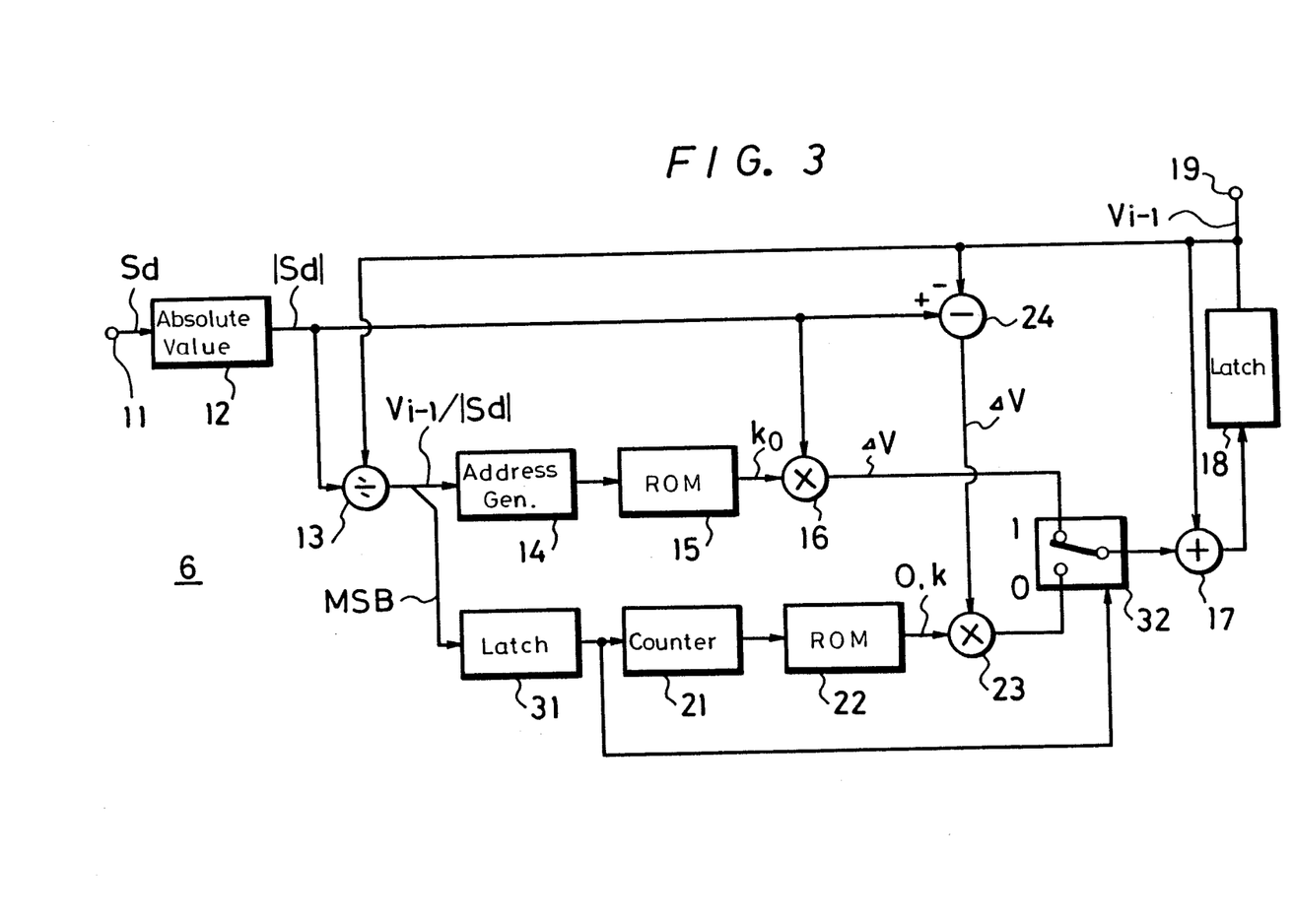
FIG. 3 is a block diagram showing an example of a prior art digital level detecting circuit with the above characteristics.

Referring to FIG. 3, the digital signal Sd is supplied through an input terminal 11 to an absolute value detecting circuit 12 in which it is converted to a signal |Sd| which indicates the absolute value |Sd| of the signal Sd at the present time t=i. The signal |Sd| is supplied to a divider circuit 13 and the divider circuit 13 is supplied the signal $V_{i-1}$ (=V(i-1)) at the sampling time t=i-1 which is just before the present time t=i from a latch circuit 18 which will be described later. The divider circuit 13 accomplishes the division of $V_{i-1}/|Sd|$ by repeating the subtraction of $(V_{i-1}/|Sd|)$ and the bit-shifting of the signal $V_{i-1}$. In the first division, when the first subtraction of $(V_{i-1} - |Sd|)$ is carried out, as will be clear from FIGS. 2A and 2B, upon attack response, $V_{i-1} - |Sd| < 0$ is established, and upon hold and recovery response, $V_{i-1} - |Sd| \geq 0$ is established so that the MSB (most significant bit or code bit) of the $(V_{i-1} - |Sd|)$ after the first subtraction becomes "1" upon attack response and "0" upon hold and recovery response operations. Therefore, this most significant bit is supplied through a latch circuit 31 to a switching circuit 32 as its control signal.

Upon attack response, the divided signal $V_{i-1}/|Sd|$ from the divider circuit 13 is supplied to an address signal generating circuit 14 which generates an address signal corresponding to each time from the ratio of $V_{i-1}/|Sd|$. This address signal is supplied to a ROM (read only memory) 15 which derives a value (coefficient) $K_0$ which results from expressing the difference amount $\Delta V$ $(=V_i - V_{i-1})$ between each time as a percentage. This value $k_0$ is supplied to a multiplying circuit 16 and the signal $|Sd|$ is supplied from the detecting circuit 12 to the multiplying circuit 16 and the signal $|Sd|$ is multiplied by the value $k_0$ to thereby contain the difference amount $\Delta V$ at each time increment.

Upon attack response, since the switching circuit 32 is connected in the manner illustrated in FIG. 3, the difference $\Delta V$ from the multiplying circuit 16 is supplied through the switching circuit 32 to an adding circuit 17 and also the signal $V_{i-1}$ from the latch circuit 18 is supplied to the adding circuit 17. Accordingly, in the adding circuit 17, the difference $\Delta V$ is added to the signal $V_{i-1}$ to thereby form the signal $V_i$ at the present time. Then, this signal $V_i$ is delivered through the latch circuit 18 to an output terminal 19 so that this signal $V_i$ has the attack response characteristic shown in FIG. 2A.

Upon hold response and recovery response, the most significant bit "0" is generated from the divider circuit 13 as described above. This most significant bit "0" is supplied through the latch circuit 31 to a timer retriggerable counter 21 as its count-clear and count-start signal (count-enable signal), whereby the counter 21 starts counting a clock (not shown) at the time $t=0$ from the count value "0". Then, the output of the counter 21 is supplied to a ROM 22 as an address signal and a value "0" is derived from the ROM 22 during the period of $t \leq t_H$, and a constant value k is derived from the ROM 22 during the period of $t > t_H$. This value 0 or k is supplied to a multiplying circuit 23.

Also, the signal $|Sd|$ from the detecting circuit 12 is supplied to a subtracting circuit 24 and the signal $V_{i-1}$ from the latch circuit 18 is supplied to the subtracting circuit 24 which derives a difference $\Delta V$ $(=|Sd| - V_{i-1})$. This difference $\Delta V$ is supplied to the multiplying circuit 23 and is multiplied by the value 0 or k. In this case, the difference $\Delta V$ is generated at every constant sampling period as shown in FIG. 2B and the recovery response characteristic is provided, as shown in Eq. (3), by adding the value a to a simple exponential function characteristic. Thus, the multiplied output of the difference amount V by the value 0 or k indicates the decreased amount (changed amount) of the signal V(t) at the hold response period $(t \leq t_H)$ and the recovery response period $(t \geq t_H)$.

At that time, since the switching circuit 32 is in the state opposite to that illustrated in FIG. 3, the multiplied output of the multiplying circuit 23 is supplied through the switching circuit 32 to the adding circuit 17. Thus, the adding circuit 17 delivers the signal $V_i$ having the hold response characteristic and the recovery response characteristic shown in FIG. 2B. Then, this signal $V_i$ is delivered to the terminal 19.

With the detecting circuit 6, as described above, it is possible to obtain the output control signal V(t) having the attack response characteristic, the hold response characteristic and the recovery response characteristic shown by the Eqs. (1) to (3).

Figure 4:
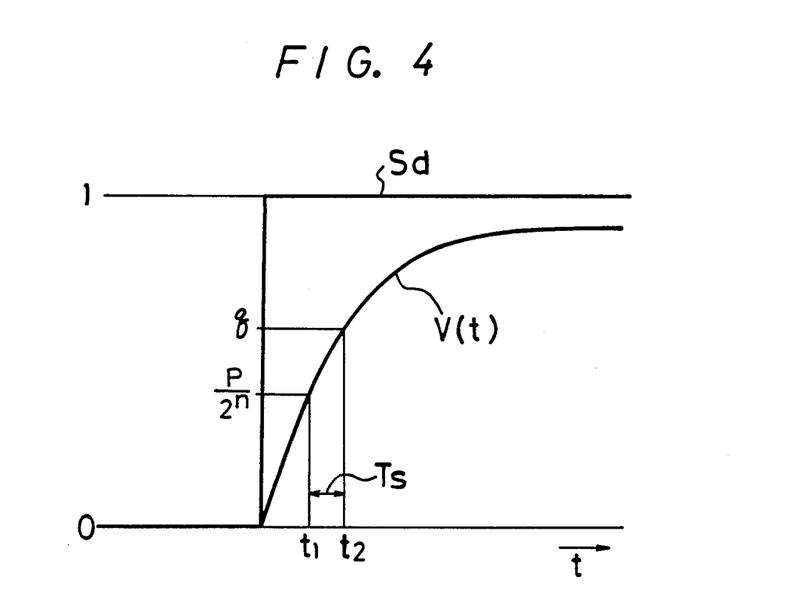
FIG. 4 is a graph used to explain the attack response characteristic.
Figure 6:
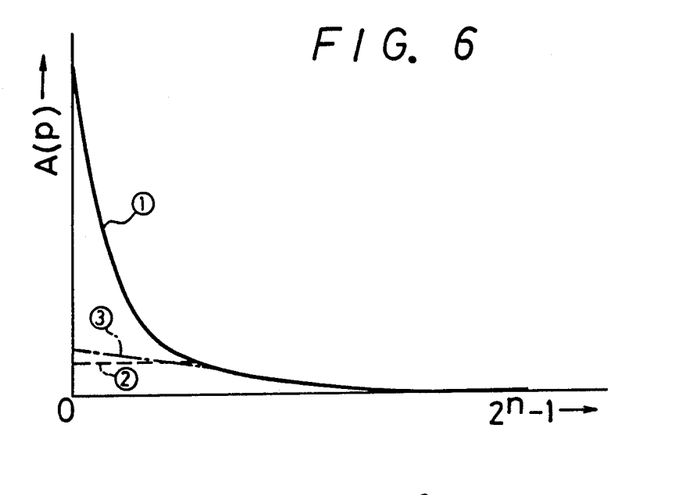
FIG. 6 is a graph used to explain a relationship between an attack response coefficient and an address of a read only memory.

The above mentioned attack response coefficient A(t) is calculated relative to the address p of the ROM 15 as follows. As shown in FIG. 4, a unit step signal is supplied to the detecting circuit 6 as the input signal Sd and the theoretical attack response characteristic (shown by Eq. (1)) of the detecting circuit 6 is used. Then, if a time t which establishes relative to the address p of the ROM 15 the following equation:

$$V(t) = p/2^n$$

where $2^n$ is the address space of the ROM 15 taken at time $t_1$ and the signal V(t) at the next sampling time $t_2$ $(= t_1 + T_s$ where $T_s$ is the sampling cycle), from time $t_1$ is expressed by the following equality:

$$V(t_2) = q$$

the data at the p address of the ROM 15, that is, the attack response coefficient A(p) at the p address of the ROM 15 becomes:

$$A(p) = q - P/2^n \qquad (5)$$

$$0 \leq P < 2^n$$

and this attack response coefficient A(p) becomes as shown by a curve ① in the graph of FIG. 6. In this case, since the abscissa in FIG. 6, that is, the address p of the ROM 15 is changed with the time t by the address signal generating circuit 14, the abscissa can be considered as the time axis.

In the practical digital level detecting circuit 6, however, it has been proved that when the attack response coefficient A(p) is the theoretical value expressed by the Eq. (5), a problem arises.

Figure 7A:
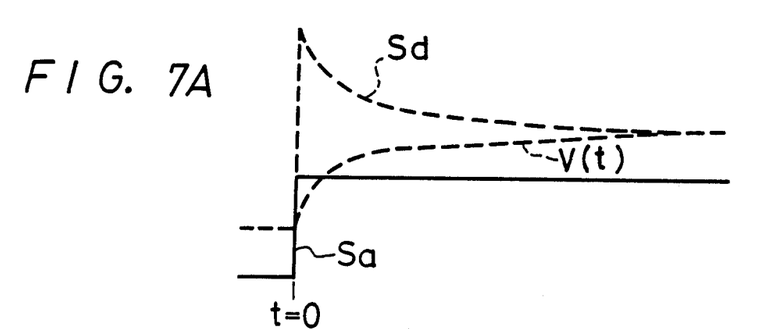
FIGS. 7A, 7B and 7C are waveform diagrams, respectively, used to explain the attack response characteristic.

Specifically, in the above mentioned level comprising circuit, if there is no delay in the signal processing accomplished by the A/D converter 4 and the like, the waveforms of the respective signals during attach response mode become as shown in FIG. 7A where the digital signal is A/D-converted and is indicated in a waveform for the analog signal. This is done in the same way as described above and does not cause particular problems.

Figure 5:
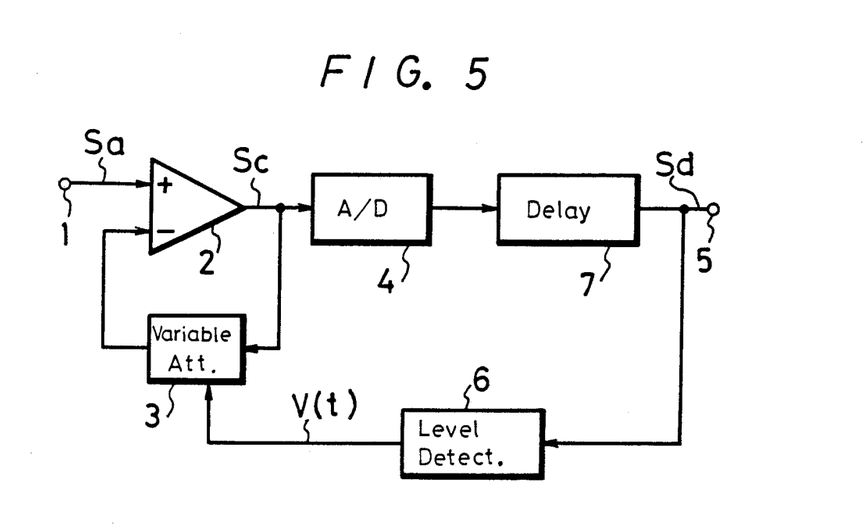
FIG. 5 is a schematic diagram showing an equivalent circuit of the level compressing circuit.

However, in practice, since there is a delay in the signal processing accomplished by the A/D converter 4 and the like, if such play is taken into consideration, the equivalent circuit for the level compressing circuit becomes as shown in FIG. 5. In FIG. 5, a delay element 7 typically represents the delay of the propagation period of the main signal line and this is equal to the delay time of about the several sampling periods.

Figure 7B:
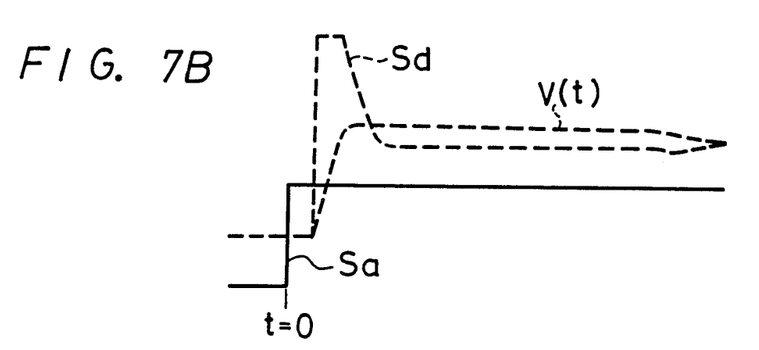

As a result, upon the attack response in the practical level compressing circuit, the signals Sd and V(t) are delayed relative to the change of the signal Sa as shown in FIG. 7B with the results that the signal Sd falls down more rapidly, that is, the attack response becomes rapid.

In this case, when the duration of the attack response is selected to be long in advance or the sampling frequency relative to the signal Sa is selected to be sufficiently high, the delay by the delay element 7 is small so that the ratio in which the attack response becomes rapid (ratio between the period in which the attack response becomes rapid and the normal attack response period) is small so that this does not cause a serious problem.

However, when the period of the attack response is selected to be short and is selected to be about twice the over-sampling period such as used in the 8-mm VTR, the electronic still camera and so on, the ratio in which the attack response becomes rapid becomes large, which cannot be neglected.

Further, in the above mentioned level detecting circuit 6, since the signal Sd is the discrete signal from a time standpoint, the attack response characteristic of the signal V(t) is scattered by the phase of the sampling time relative to the signal Sa (Sc).

Figure 8A:
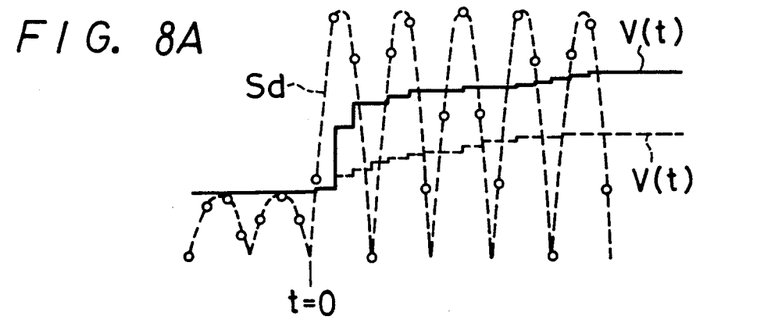
FIGS. 8A and 8B are respectively diagrams used to explain the attack response characteristic.
Figure 8B:
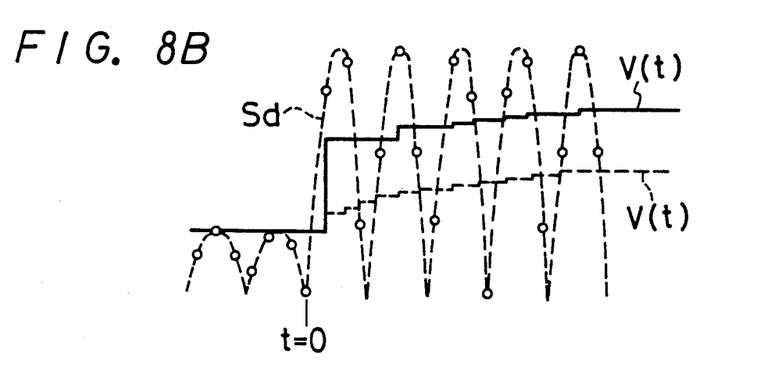

FIGS. 8A and 8B illustrate the signals Sd and V(t) in the form of an analog signal. If the signal Sd is a continuous signal from a time standpoint and is changed as shown by the broken line, the practical signal which is discrete from a time standpoint is obtained by every sampling instance so that it is distributed as shown by the marks O in FIGS. 8A and 8B. FIGS. 8A and 8B illustrate the condition where the phase at the sampling time for the signal Sd is different.

Since the attack response coefficient A(p) is large near the start time (t≃0) of the attack response, as shown by solid lines in FIGS. 8A and 8B, the rise of the signal V(t) becomes different and largely depends on the sampling times of the signal Sd. Then, since the sampling time for the signal Sd is different dependent on the signal Sd, the attack response characteristic is scattered dependent on the signal Sd.

With respect to the hold response characteristic, as shown by the Eq. (2), it is expressed by the following equation during the period of $0 \leq t \leq t_H$ $$V(t) = a$$

Thus, the level at the time, t=0 is completely held and this is the ideal hold response characteristic.

However, in practice, since the signal Sd is discrete from a time standpoint, an error will occur in the signal V(t).

Figure 9:
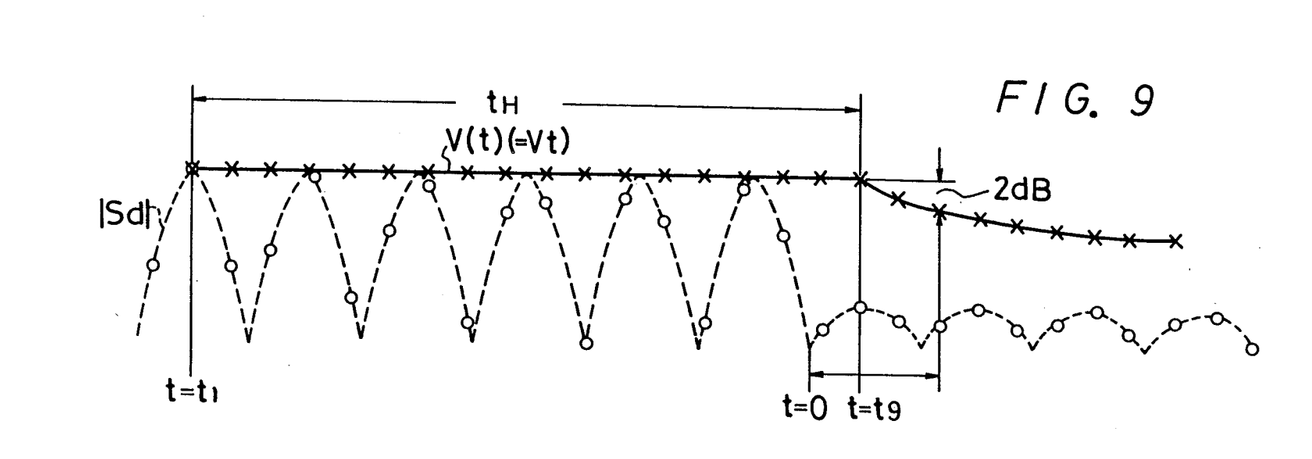
FIG. 9 is a diagram used to explain the operation of the digital level detecting circuit shown in FIG. 3.

FIG. 9 shows the signals Sd and V(t) in the form of an analog signal. If the signal Sd is continuous from a time standpoint and is changed as shown by the broken line in the Figure, the practical signal Sd, which is discrete from a time standpoint, is obtained at every sample time and hence is distributed as shown by marks O in FIG. 9.

If the signal Sd provided at a certain time $t=t_1$ is a data which results from sampling the peak value, the signal Sd and the sampling frequency are not synchronized with each other so that the signal Sd at this time $t_1$ becomes the last maximum value and the succeeding signal Sd becomes a smaller value than that of the signal at the time $t_1$.

Accordingly, in the above mentioned digital level detecting circuit 6, the signal V(t) is changed as shown by marks X, that is, $V_{i-1} \geq |Sd|$ is established from the time $t_1$ so that the most significant bit from the divider circuit 13 becomes "0" from the time $t_1$. As a result, the signal V(t) is held from the time, $t=t_1$. At a time $t_9$ after the time $t_1$ by a period $t_H$ occurs, the detecting circuit 6 is set to the recovery response operation mode.

Since the time $t_1$ at which the signal Sd becomes the data which results from sampling the peak value is changed in association with the sampling operation of the signal Sd, also the position of the hold response operation period $t_H$ is changed. As a result, the holding time (for example, the period from the time t=0 to a time at which the level of the signal V(t) is lowered by 2 dB) is considerably scattered from 0 (time at which the time t=0 and a time $t_9$ coincide with each other) at minimum to a set value $t_H$ (time at which the time t=0 and $t_1$ coincide substantially) at maximum.

In the 8-mm VTR, for example, it is assumed that the signal processing of the PCM audio signal is carried out by the level compressing and that the output control signal V(t) is generated in analog fashion. Accordingly, although the signal V(t) is changed as shown by a solid line in FIG. 10, the signal V(t) is changed in the above mentioned detecting circuit 6 as shown by a broken line and the difference therebetween (the hatched portion) causes a problem from an auditory standpoint.

OBJECTS AND SUMMARY OF THE INVENTION

Accordingly, it is an object of this invention to provide an improved digital level detecting circuit.

It is another object of this invention to provide a digital level detecting circuit which can provide a correct and uniform attack response characteristic.

It is a further object of this invention to provide a digital level detecting circuit in which the compatibility with an analog system can be improved.

It is a still further object of this invention to provide a digital level detecting circuit in which a substantially correct hold operation can be accomplished.

It is yet a further object of this invention to provide a digital level detecting circuit which can improve the auditory characteristic.

According to one aspect of the present invention, there is provided a digital level detecting circuit for controlling the amplitudes of digital audio signals comprising: means for generating an attack response to output control signals based on positive going waveforms of an incoming signal and attack response coefficients stored in a memory, wherein the attack response coefficients stored in said memory are limited to a lower value than the theoretical values at the beginning of the attack response.

These and other objects, features and advantages of the present invention will become apparent from the following detailed description of the preferred embodiments taken in conjunction with the accompanying drawings, throughout which like reference numerals designate like elements and parts.

DESCRIPTION OF THE PREFERRED EMBODIMENTS

Now, the present invention will hereinafter be described in detail.

Figure 11:
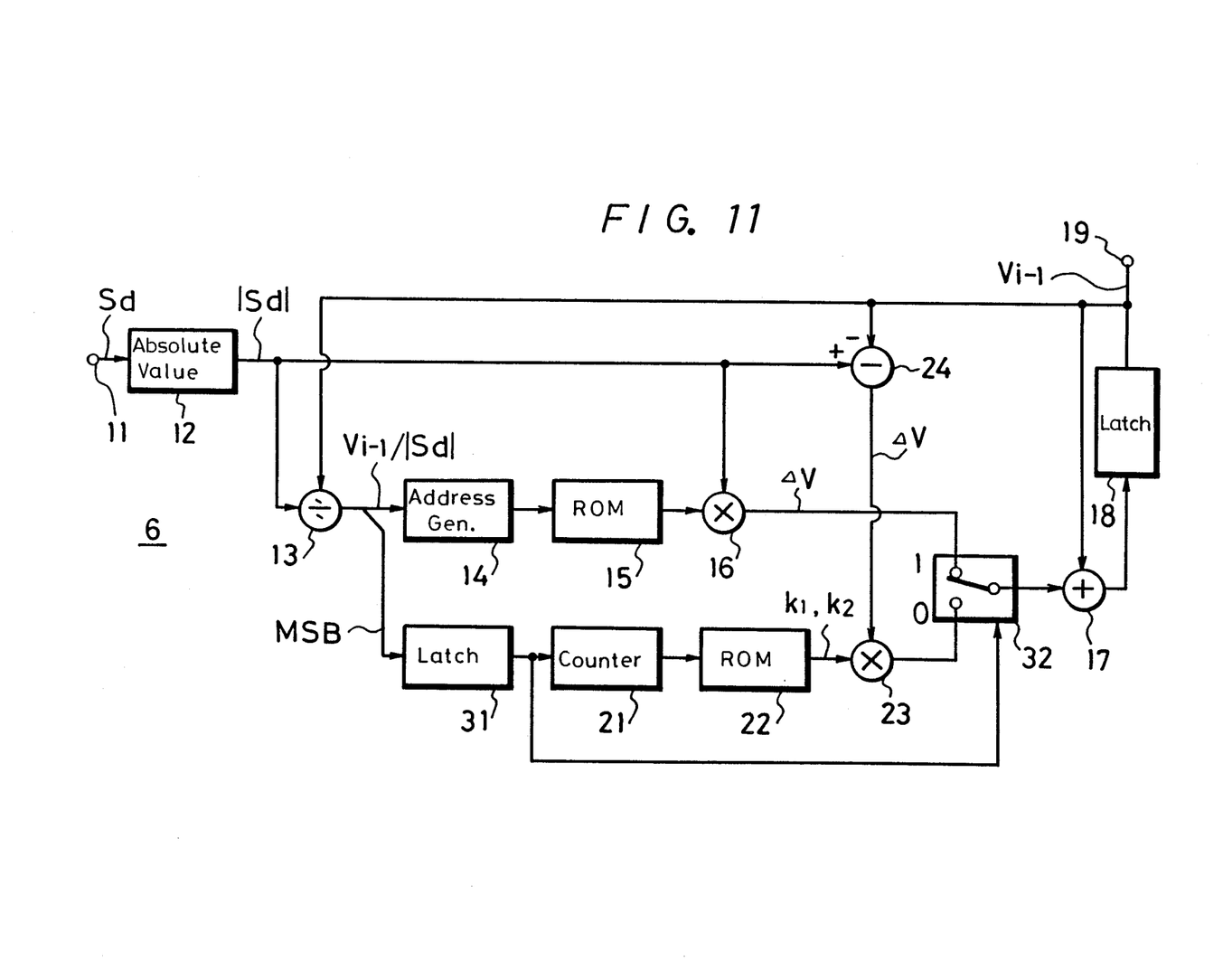
FIG. 11 is a block diagram showing an embodiment of a digital level detecting circuit according to the present invention.

FIG. 11 is a block diagram showing an embodiment of a digital level detecting circuit according to the present invention. FIG. 11 is different from FIG. 3 only in that the contents of the ROM 15 and ROM 22 are changed and hence, other circuit arrangements are the same as described with reference to FIG. 3.

Particularly referring to FIG. 11, a characteristic value shown by the curves ② or ③ in FIG. 6 is written in the ROM 15 as the attack coefficient A(p). In this case, in the small area of the address p, the attack coefficient A(p) is selected to be small in response to the amount of delay of the delay element 7, wherein it is substantially equal to a straight line in curve ② and is the same as a charging curve (exponential function characteristic) of a capacitor. The curve ③ is made larger than the curve ②.

Figure 7C:
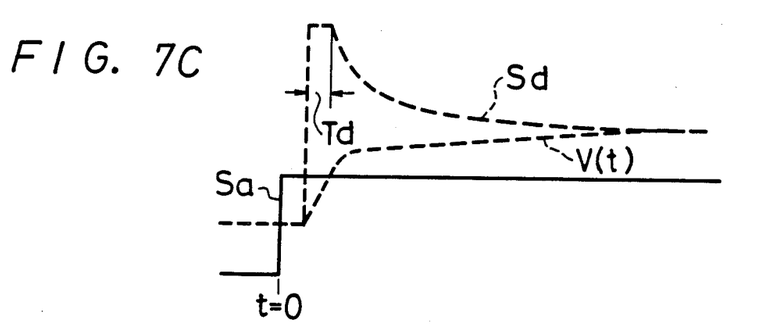

According to the circuit arrangement as described above, the attack coefficient A(p) is smaller than the normal value expressed by the Eq. (5) in the small area of the address p of the ROM 15, that is, near the starting time of the attack response operation so that the signals Sd and V(t) are changed as shown in FIG. 7C. Hence, except during the period Td, the signal Sd approximates the normal change (FIG. 7A) presented when the delay element 7 is not provided.

Although the signal Sd is displaced from the normal change during the period Td, the duration of this period Td is about several milli seconds. As is conventional, due to the masking effect, that is, the outgoing masking effect which causes a momentary excessive sound to be masked by the following sound, the different of the signal Sd during the period Td cannot be discriminated.

Further, according to the PCM audio signal standard of, for example, the 8-mm VTR, in the attack response characteristic when compressing the level, a period in which the level of the input signal having a frequency of 5 kHz is increased stepwise by 20 dB and becomes a level larger than the converged level by 2 dB and is standardized as 3 milli seconds occurs so that the level difference of the signal Sd during the period Td does not cause any problems.

Consequently, according to the present invention, even when the delay element 7 is provided in the main signal line, it is possible to obtain an attack response characteristic equivalent to the normal attack response characteristic from an auditory standpoint.

Furthermore, since the attack coefficient A(p) is small near the starting time of the attack response operation, as shown by bold broken lines in FIGS. 8A and 8B, even when the phase of the signal Sd at the sampling time point is different, the amount of rise of the signal V(t) is reduced and the scattering of the attack response characteristic is reduced so that a relatively uniform attack response characteristic can be obtained.

When the attack coefficient A(p) is limited, the characteristic of the signal Sd becomes similar to the characteristic provided when all signals are processed in an analog fashion. Thus, the compatibility of the digital level detecting circuit of the invention with the analog system can be improved.

Figure 12:
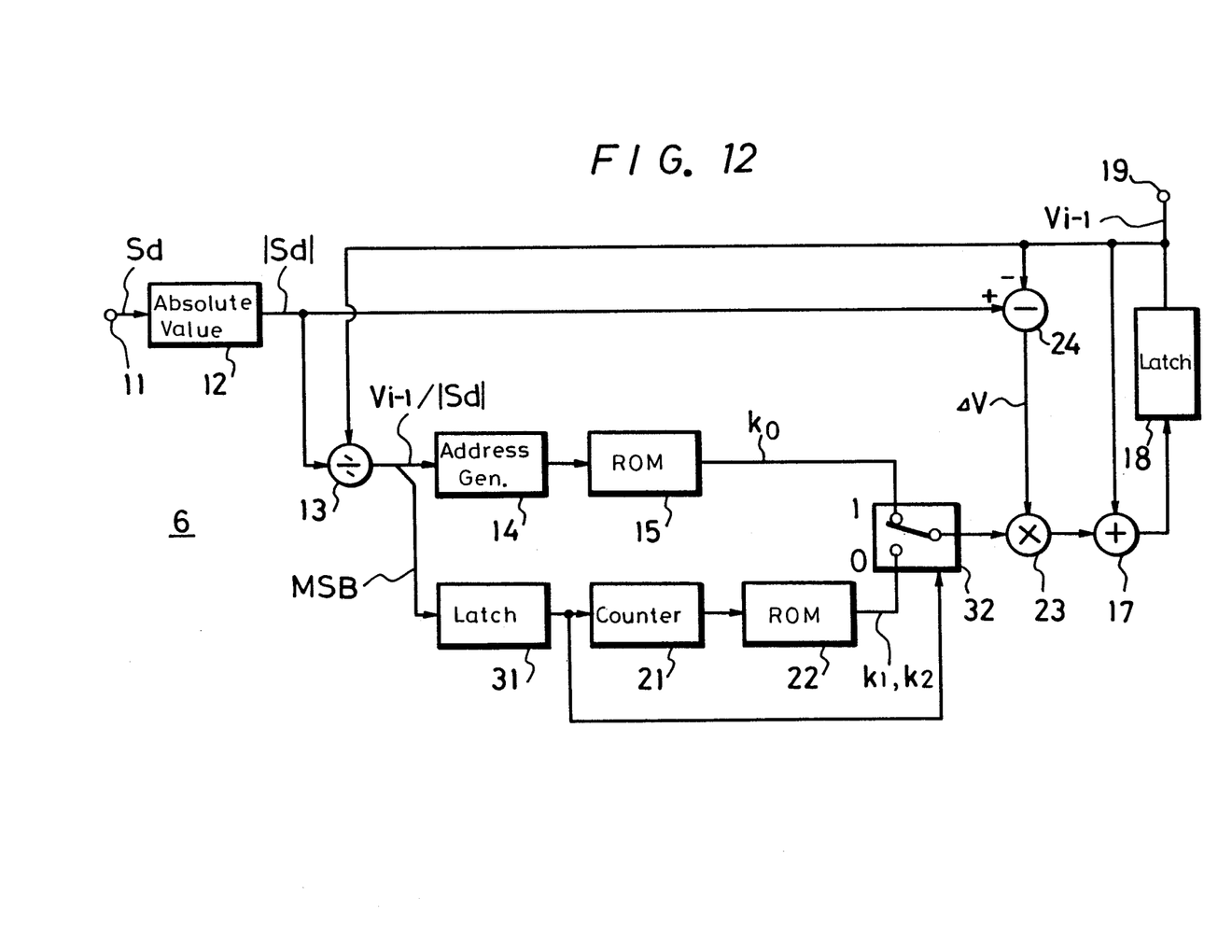
FIG. 12 is a block diagram showing another embodiment of the digital level detecting circuit according to the present invention.

FIG. 12 is a block diagram showing another embodiment of the digital level detecting circuit according to the present invention. In FIG. 12, like parts corresponding to those of FIG. 11 are marked with the same references and will not be described in detail.

In the embodiment shown in FIG. 12, during the attack response operation, the attack coefficient A(p) is multiplied by the difference ΔV and then sequentially added to thereby obtain a predetermined attack response characteristic.

While in the previously described embodiment the attack response characteristic can be improved by limiting the attack coefficient A(p), a version is also possible in which the attack response characteristic is improved by similarly limiting the attack coefficient A(p) by computing in the multiplying circuit 23 or the adding circuit 17.

According to the present invention, the hold response characteristic and the recovery response characteristic can be respectively improved as follows.

Referring to FIG. 11, a value $k_1$ is written in the ROM 22 as the coefficient of the hold response characteristic, and a value $k_2$ is written therein as the coefficient of the recovery response characteristic where:

$k_1 < 0$ and $k_2 < (k_2 = k)$ $|k_1| < |k_2|$ are established, respectively.

Figure 13:
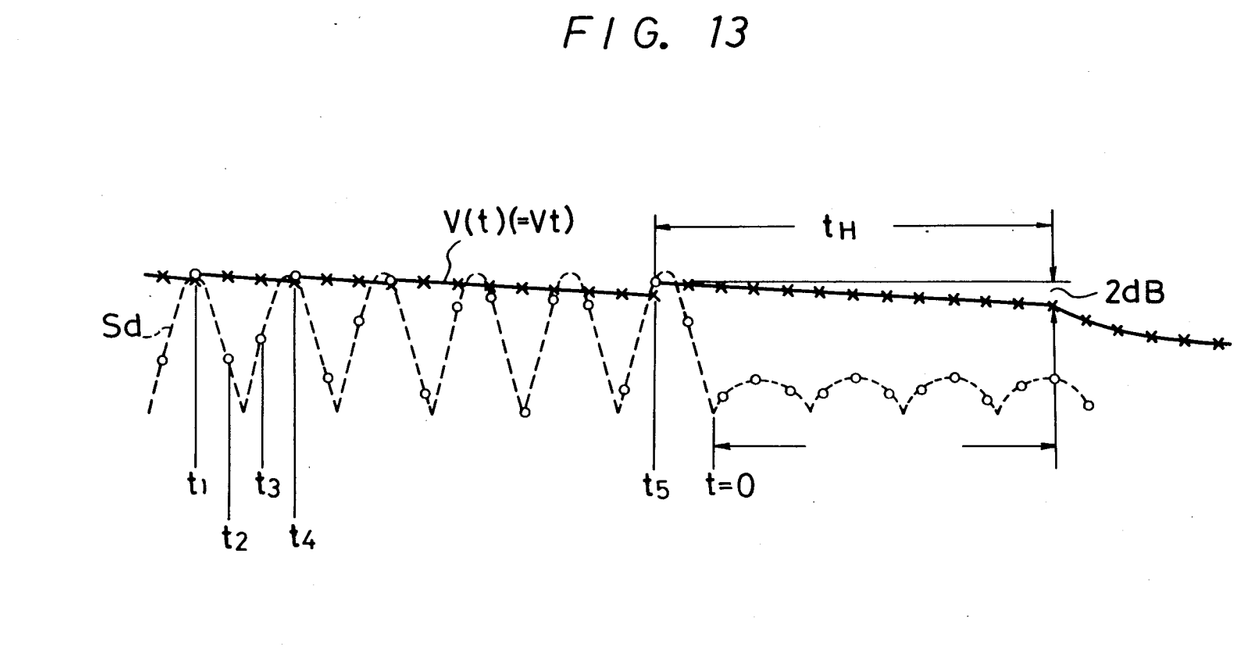
FIG. 13 is a waveform diagram used to explain the operation of the embodiment of the present invention shown in FIG. 11.

According to the thus constructed arrangement, when the signal Sd is changed as shown in FIG. 13 (FIG. 13 shows the signal Sd in the same manner as in FIG. 9), the hold response operation is started at the time $t_1$. At that time, since the output of the ROM 22 becomes the value $k_1$ (=0), if the output control signal V(t) is continuous from a time standpoint, the output control signal V(t) is lowered gently in response to the value $k_1$ as shown by a fine line in FIG. 13 (marks X represent the output control signal V(t) which is made discrete in practice).

At the sampling times $t_2$ and $t_3$ following the time $t_1$, $V_{i-1} \leq |Sd|$ (this signal $|Sd|$ is the absolute value of the signal Sd at the times $t_2$ and $t_3$ and equivalent to those shown by marks ○ in FIG. 13) is established with the result that the hold response operation is carried out at the times $t_2$ and $t_3$.

However, since $V_{i-1} < |Sd|$ is established at the next sampling time $t_4$, the attack response operation is carried out at this time $t_4$ and hence the output control signal V(t) is raised in level (shown by the fine line in FIG. 13).

Thereafter, since the operation at the times $t_2$, $t_3$ and $t_4$ are respectively carried out at respective sampling times, the output control signal V(t) becomes as shown by the marks X.

Then, at a time $t_5$, $V_{i-1} \geq |Sd|$ is established so that the attack response operation is carried out at this time $t_5$. Thereafter, $V_{i-1} < |Sd|$ is established so that the hold response operation mode is started from the time $t_5$, the hold response characteristic is presented during the period $t_H$ from the time $t_5$ and thereafter the recovery response characteristic is presented.

Figure 10:
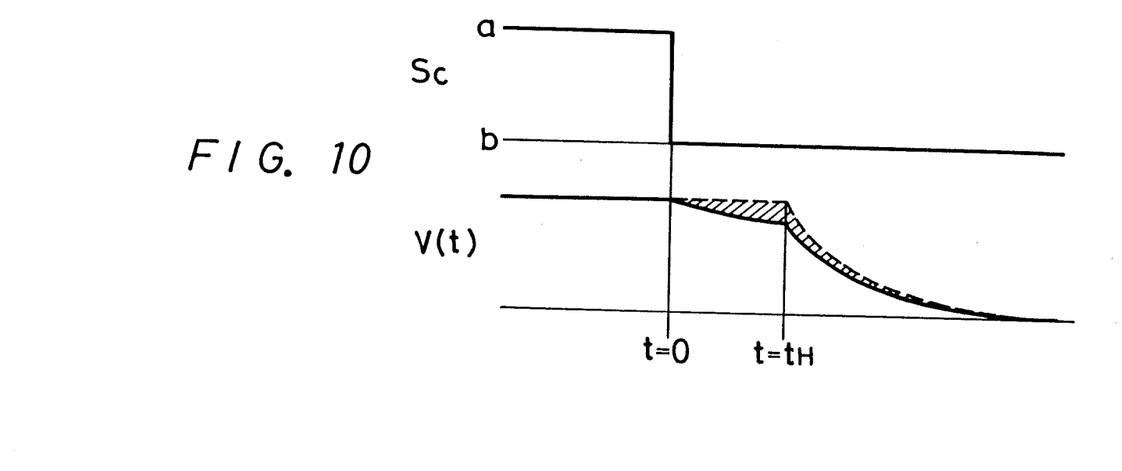
FIG. 10 is a schematic diagram used to explain defects of the prior art.

Also during the period $t_H$ of this hold response characteristic, the output control signal V(t) is lowered gently in response to the value $k_1$. When the step input as shown in FIG. 10 is supplied, the hold response characteristic is indicated as:

$$V(t) = (b-a) \exp(-t/T_H) + a \quad (6)$$

and the recovery response characteristic is expressed as:

$$V(t) = (b - V(t_H)) \exp(-(t-t_H)/T_R) + V(t_H) \quad (7)$$

These Eqs. (6) and (7) are the same as the discharge curve (exponential function characteristic) of the capacitor. Further, if $V(t_H) = a$ is satisfied in Eq. (7), this Eq. (7) coincides with the Eq. (3).

According to the present invention as described above, also upon hold response operation mode, the level of the signal V(t) is lowered so that as will be clear from FIG. 13, the hold response operation is substantially equivalent to the inherent and correct hold response operation. That is, the time $t_4$ at which $V_{i-1} < |Sd|$ is established is not placed within the semicycle period just before the time t=0 as shown in FIG. 13 and thus the position of the hold response operation period $t_H$ may be displaced back and forth. However, while the sampling period is set in the order of a microsecond, the hold response operation period $t_H$ is set in the order of a milli second. Accordingly, the displacement of the position of the hold response operation period $t_H$ can be reduced sufficiently. Particularly, if $|k_1|$ is selected to be large, the displacement of the position of the hold response operation period $t_H$ can be additionally reduced. In this connection, in the case of the 8-mm VTR, $t_H$ is selected to be 5.4 milli seconds, the sampling period is selected to be 15.6 micro-seconds (over-sampling four times the normal sampling), $k_1$ is selected as $-3.66 \times 10^{-5}$ and $k_2$ is selected as $-3.66 \times 10^{-4}$, for example.

Further, since the output control signal V(t) is also lowered during the hold response operation period $t_H$, the difference relative to the signal processing in an analog fashion (the hatched portion in FIG. 10) is reduced, improving the characteristic from the auditory standpoint.

Also in accordance with the second embodiment shown in FIG. 12, it is possible to employ the ROM 22 into which the value $k_1$ is written as the coefficient for the hold response characteristic and the value $k_2$ is written as the coefficient of the recovery response characteristic.

In the above mentioned embodiment, the value $k_1$ during the hold response operation is changed with time and can be coincident with or be approximately the characteristic during the analog signal processing as shwon in FIG. 10. In addition, this invention can be applied to the level detecting circuit of a level expanding circuit.

According to the present invention as set forth above, since the attack response coefficient A(p) near the starting time of the attack response operation is selected to be smaller than the normal value, even when the delay element 7 is provided in the main signal line, it is possible to obtain an attack response characteristic equivalent to the normal attack response characteristic from the auditory standpoint.

Further, since the attack response coefficient A(p) is small in the nearby portion of the starting time of the attack response operation, as shown by the bold broken lines in FIGS. 7A and 7B, even when the phase of the signal Sd at the sampling time is different, the rising amount of the output control signal V(t) is reduced and the scattering of the attack response characteristic can be reduced, thus providing a relatively uniform attack response characteristic.

Furthermore, since the characteristic of the signal Sd is approximated to the characteristic provided when all signals are processed in an analog fashion by limiting the attack response coefficient A(p), the compatibility of the digital level detecting circuit of the invention with the analog system can be improved.

Furthermore, according to the present invention, also in the hold response operation mode, the output control signal V(t) is lowered in level so that as will be clear from FIG. 10, the hold response operation substantially equivalent to the inherent and correct hold response operation is accomplished.

In addition, since the output control signal V(t) is lowered in level also during the hold response operation period $t_H$, the difference relative to the case of the signal processing of the analog manner can be reduced, improving the charcteristic from the auditory standpoint.

The above description is given for the preferred embodiments of the invention but it will be apparent that many modifications and variations could be effected by one skilled in the art without departing from the spirit or scope of the novel concepts of the invention so that the scope of the invention should be determined only by the appended claims.

I claim as my invention:

1. A digital level detecting circuit for controlling the amplitude of digital audio signals, comprising: means for generating an attack response of output control signals based on positive going waveforms of an incoming signal and based on attack response coefficients stored in a memory, wherein the attack response coefficients stored in said memory have a relatively low value during the beginning of the attack response, and wherein said attack response generating means includes an address generator which generates address data to be supplied to said memory based on ratios of the incoming signal and the output control signals.

2. A digital level detecting circuit according to claim 1, wherein said attack response generating means further includes a multiplier circuit which multiplies said incoming signal and said attack response coefficients from said memory, and the outputs of said multiplier circuit are supplied to an output terminal for said output control signal through an adder circuit and a timing circuit.

3. A digital level detecting circuit according to claim 2, wherein said adder circuit of the attack response generating means is supplied with said outputs from said multiplier circuit and an output control signal.

4. A digital level detecting circuit according to claim 1, wherein said attack response generating means includes a subtracter circuit for obtaining the difference between said incoming signal and said output control signal, and said difference is multiplied by said attack response coefficients obtained from said memory in a multiplier circuit.

5. A digital level detecting circuit according to claim 4, wherein the outputs from said multiplier circuit are supplied to an output terminal for said output control signal through an adder circuit and a timing circuit.

6. A digital level detecting circuit according to claim 5, wherein said adder circuit of said attack response generating means is supplied with said outputs from said multiplier circuit and an output control signal.

7. A digital level detecting circuit for controlling the amplitude of digital audio signals, comprising: means for generating an attack response of output control signals based on positive going waveforms of an incoming signal and based on attack response coefficients stored in a memory, wherein the attack response coefficients stored in said memory have a relatively low value during the beginning of the attack response, and further comprising means for generating hold and recovery response of said output control signals based on negative going waveforms of the incoming signal and hold and recovery coefficients, and wherein said hold coefficients are not zero.

8. A digital level detecting circuit according to claim 7, wherein said hold and recovery response generating means includes a memory for storing said hold and recovery coefficients.

* * * * *